US009390554B2

(12) United States Patent
Goel et al.

(10) Patent No.: US 9,390,554 B2
(45) Date of Patent: Jul. 12, 2016

(54) OFF CHIP MEMORY FOR DISTRIBUTED TESSELLATION

(75) Inventors: Vineet Goel, Winter Park, FL (US);
Jason David Carroll, Oviedo, FL (US);
Mangesh Nijasure, Orlando, FL (US);
Todd Martin, Orlando, FL (US)

(73) Assignee: Advanced Micro Devices, Inc.,
Sunnyvale, CA (US)

( * ) Notice: Subject to any disclaimer, the term of this patent is extended or adjusted under 35 U.S.C. 154(b) by 137 days.

(21) Appl. No.: 13/449,410

(22) Filed: Apr. 18, 2012

(65) Prior Publication Data

US 2013/0169634 A1 Jul. 4, 2013

Related U.S. Application Data

(60) Provisional application No. 61/581,223, filed on Dec. 29, 2011.

(51) Int. Cl.
*G06T 15/30* (2011.01)
*G06T 17/20* (2006.01)
*G06T 15/00* (2011.01)

(52) U.S. Cl.
CPC .............. *G06T 17/20* (2013.01); *G06T 15/005* (2013.01)

(58) Field of Classification Search
None
See application file for complete search history.

(56) References Cited

U.S. PATENT DOCUMENTS

| 2002/0008698 | A1* | 1/2002 | Pentkovski et al. | 345/419 |
|---|---|---|---|---|
| 2006/0238535 | A1* | 10/2006 | Goel et al. | 345/423 |
| 2009/0179903 | A1* | 7/2009 | Lee et al. | 345/503 |
| 2010/0164954 | A1* | 7/2010 | Sathe et al. | 345/423 |
| 2011/0066830 | A1* | 3/2011 | Wolfe et al. | 712/228 |
| 2011/0085736 | A1* | 4/2011 | Dmitriev et al. | 382/199 |
| 2012/0096474 | A1* | 4/2012 | Jiao | 718/107 |
| 2013/0067122 | A1* | 3/2013 | Pavlov | 710/22 |

* cited by examiner

*Primary Examiner* — James A Thompson
*Assistant Examiner* — Xilin Guo
(74) *Attorney, Agent, or Firm* — Volpe and Koenig, P.C.

(57) ABSTRACT

Embodiments include an apparatus, a computer readable medium and a method for distributing tessellations within an accelerated processing device (APD) including at least two compute units. Embodiments include processing a plurality of patches in a first compute unit using a hull shader to generate hull shader output data. Once generated, hull shader output data is stored to an off-chip memory when tessellation factors associated with the shader program are greater than a configured threshold. Once stored in the off-chip memory, at least a portion of the hull shader output data is dynamically processed using a second compute unit.

17 Claims, 5 Drawing Sheets

OFF CHIP MEMORY FOR DISTRIBUTED TESSELLATION

CROSS REFERENCE TO RELATED APPLICATIONS

This application claims benefit under 35 U.S.C. §119(e) to U.S. Provisional Patent Application No. 61/581,223, filed Dec. 29, 2011, which is incorporated by reference herein in its entirety.

BACKGROUND

1. Field of the Invention

The present invention is generally directed to computing operations performed in computer systems. More particularly, the present invention is directed to an accelerated processing device (APD), such as a graphical processing unit (GPU), that performs computing operation

2. Background Art

An APD is a complex integrated circuit specially designed to perform data-parallel computing tasks, such as graphics-processing. An APD may, for example, execute graphics-processing tasks required by an end-user application, such as video-game applications or media applications.

Several layers of software exist between the end-user application and the APD, one such layer being an application-programming interface (API). The end-user application communicates with the API—allowing the end-user application to output graphics data and commands in a standardized format, rather than an APD dependent format. The API communicates with a driver that translates standard code into a native format of instructions that can be interpreted and executed by the APD. For example, Direct3D 11 is an API configured for communication with the driver.

Direct3D 11 (hereinafter known as Dx11), developed by Microsoft Corporation of Redmond, Wash., is compatible with a large segment of end users. Dx11 is used to render three dimensional (3-D) graphics in performance sensitive applications, such as video-game applications. In a Dx11 pipeline, patches are used as an input workload for a hull shader. The hull shader is a programmable shader, within the APD's shader core, that produces a geometry patch corresponding to each input patch. The hull shader also computes tessellation factors for each patch. These patches are then tessellated into smaller primitives based upon the tessellation factors. For example, a tessellation engine can generate between 0 and 8192 post-tessellation primitives per patch depending on the tessellation factors. The post tessellation primitives are used as inputs for a domain shader. The domain shader is another programmable shader, within the shader core engine, that calculates a vertex position of post tessellation primitives.

Typically, a user is allowed to generate tessellation factors from 0 to 64 for each patch being processed. In one example, a user can select a tessellation factor of 64 for a first group of patches, which would result in 8192 primitives. Generating 8192 primitives is a fairly substantial workload for the graphics pipeline. In another example, a user can select a tessellation factor of 1 for a second group of patches that would produce an output result of two primitives. Although generating two primitives is fairly light workload, the difference between these two extremes creates the more significant challenge of unbalanced workloads within the Dx11 graphics pipeline.

These unbalanced workloads within the Dx11 pipeline create bottlenecks for data when system resources are available. A drawback of having unbalanced workloads is that the second group of patches with low tessellation levels must wait until the first group finishes processing at the higher tessellation levels.

This drawback is compounded as more groups of patches with lower tessellation levels are added to the graphics pipeline. Additional latency within the pipeline is created because groups of data must wait for processing within the hull shader. At the same time, other pipeline shader resources are available but are not being used.

SUMMARY OF EMBODIMENTS

What is needed, therefore, are methods and systems to improve shader resource utilization.

Embodiments of the present invention, in certain circumstances, provide a computer-implemented method for distributing tessellations within an APD. The method includes processing, using a hull shader program, a plurality of patches in a first compute unit and generating hull shader output data from the processed plurality of patches. The method also includes storing the hull shader output data in an off-chip memory when hull shader tessellation factors are greater than a threshold and processing at least a portion of the stored hull shader output data using a second compute unit.

Additional features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
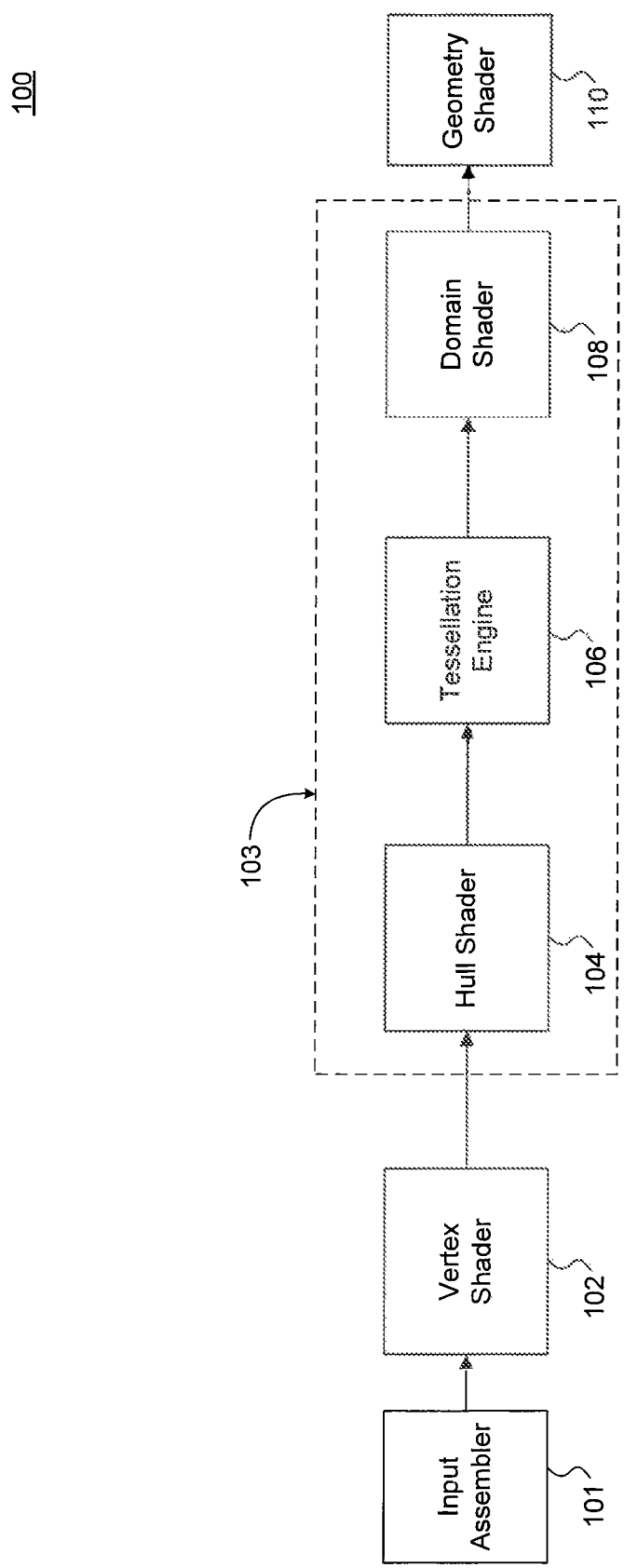
FIG. 1 illustrates an exemplary block diagram of the tessellation stages in a Dx11 pipeline.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS

In the following description, numerous specific details are set forth in order to provide a thorough understanding of the invention. However, it will be apparent to those skilled in the art that the invention, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the invention.

Reference in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

FIG. 1 is a block diagram illustration of a conventional tessellation stage 103 of a Dx11 graphics pipeline 100, e.g., such as a Dx11 implementation. Graphics pipeline 100 includes an input assembler 101, vertex shader 102, tessellation stage 103, and geometry shader 110. Some embodiments are described in the context of a Dx11 implementation, but the invention is not limited to only Dx11 implementations. Tessellation stage 103 includes hull shader (HS) 104, tessellation engine 106, and domain shader 108. Vertex shader 102 is an application program for processing graphics data. Vertex shader 102 manipulates vertex patches, which include properties, such as position, color and texture coordinates of each vertex. More specifically, vertex shader 102 executes a function that adds special effects to objects in the 3-D environment. Vertex patches (hereinafter refer to as "patches") are data structures representative of control points in two dimensional (2-D) and 3-D space. These patches are provided as input data to HS 104.

As understood by one of skill in the relevant art(s), HS 104 includes patch constant function and a hull program. The patch constant function is responsible for computing data that remains constant over the entire patch. The HS program computes the patch based upon the input control points.

By way of one example, the hull program can process control points by performing an execution once per control point. For example, if there are 32 control points, the hull program will be executed 32 times per patch. Alternatively, the hull program can be configured to process a number of different control points. In another example, the hull program can be configured to process 32 control points, four at a time. In this example, the hull program will be executed 8 times per patch. This alternative configuration of the hull program adds flexibility, enabling a user to save processing time at various points in the graphics pipeline.

HS 104 also generates the tessellation factors, the range from 0 to 64. The tessellation engine 106 uses the tessellation factors to control the amount of tessellation applied to each patch.

By way of example, tessellation engine 106 receives a patch from HS 104 having a tessellation factor of 64. Tessellation engine 106 uses the tessellation factors to subdivide the patch into 8192 primitives. The primitives can assume a triangular, quadrilateral, or other suitable shape. After tessellation engine 106 processes the patch, data results are output to domain shader 108 as control points (e.g., domain points and connectivity points).

Based upon the control points, domain shader 108 calculates a vertex position of the primitives. Domain shader 108 is invoked once for every control point received from tessellation engine 106. After domain shader 108 completes the processing of control points its output is dispatched to geometry shader 110.

Figure 2:
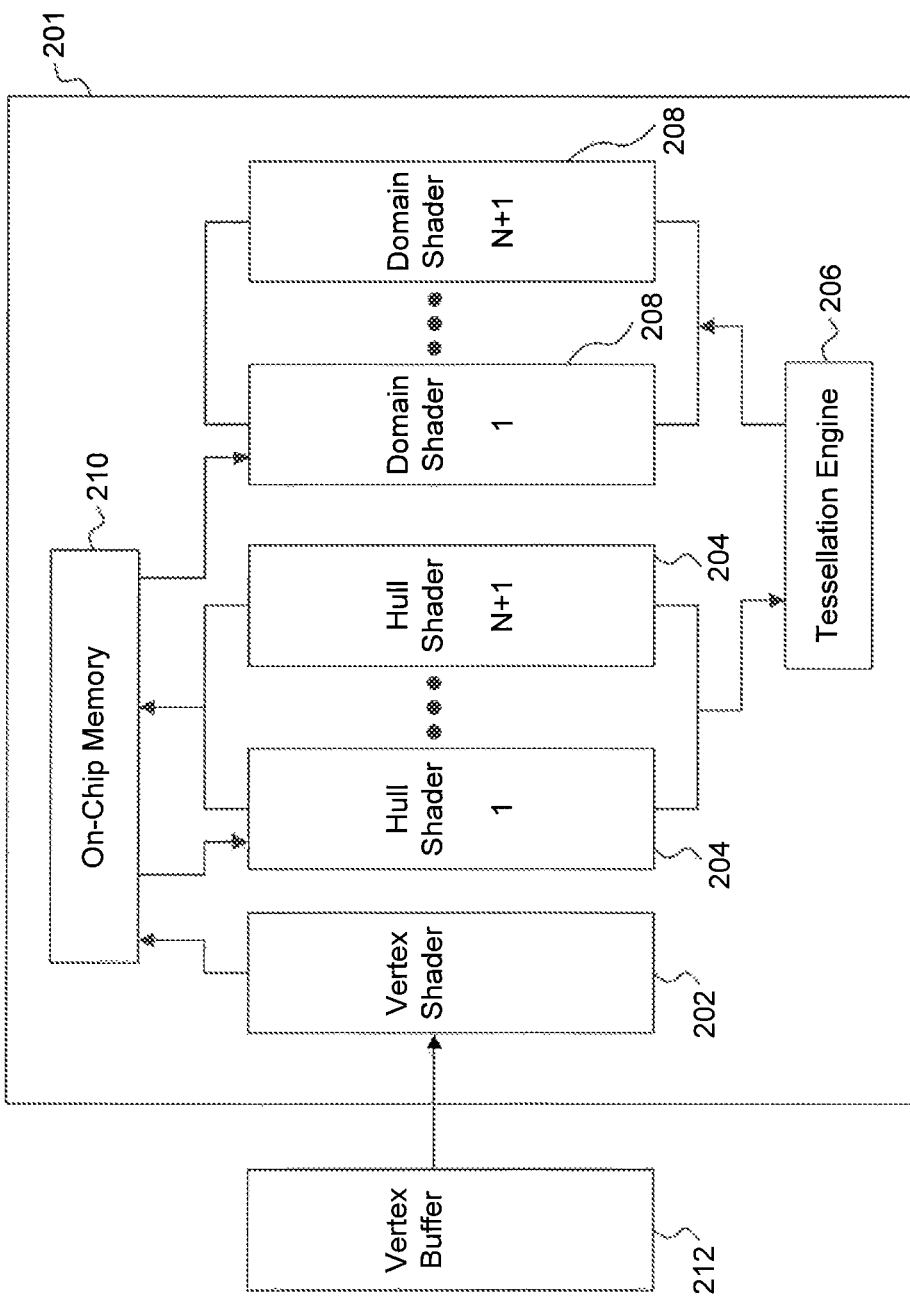
FIG. 2 illustrates an exemplary block diagram of a conventional GPU pipeline using a Dx11 pipeline.

FIG. 2 is a block diagram illustration of compute unit 201 in a conventional GPU environment 200. The conventional GPU environment includes a compute unit 201 having a vertex shader 202, HSs 204, a tessellation engine 206, domain shaders 208 and an on-chip memory 210. In the conventional compute unit 201, tessellation engine 206 is a fixed function device that produces primitives based on the generated tessellation factors. Vertex shader 202 is a program that executes wavefronts received from a scheduler (not shown).

Vertex shader wavefronts are vectors formed from patch vertices. Patches contain input control points that can be used as inputs to shaders. For example, vertex shader 202 receives vertex shader wavefronts and, in response, retrieves input data from vertex buffer 212. Vertex shader 202 executes each vertex shader wavefront using the retrieved data. Vertex shader 202 outputs and stores vertex shader output data to on-chip memory 210. When the final vertex shader wavefront has been processed, vector shader 202 sends a notification to a scheduler (not shown).

A shortcoming of the conventional compute unit 201 is that it can often have unbalanced workloads. For example, a user is allowed to generate tessellation factors from 0 to 64 for each patch that is processed. A user having a first group, a second group, and a third group of patches can set a tessellation factor to 64 for the first group and a tessellation factor of 2 for the second and third groups. A tessellation factor of 64 will result in 8192 primitives of the post-tessellation output and a tessellation factor of 2 will result in 4 primitives of the post tessellation output. Therefore, the second and third groups of patches can become bottlenecked by the first group of patches because of its high level of tessellation. This bottlenecking occurs even though, at the same time, free shader resources are available to process the second and third group of patches.

Figure 3:
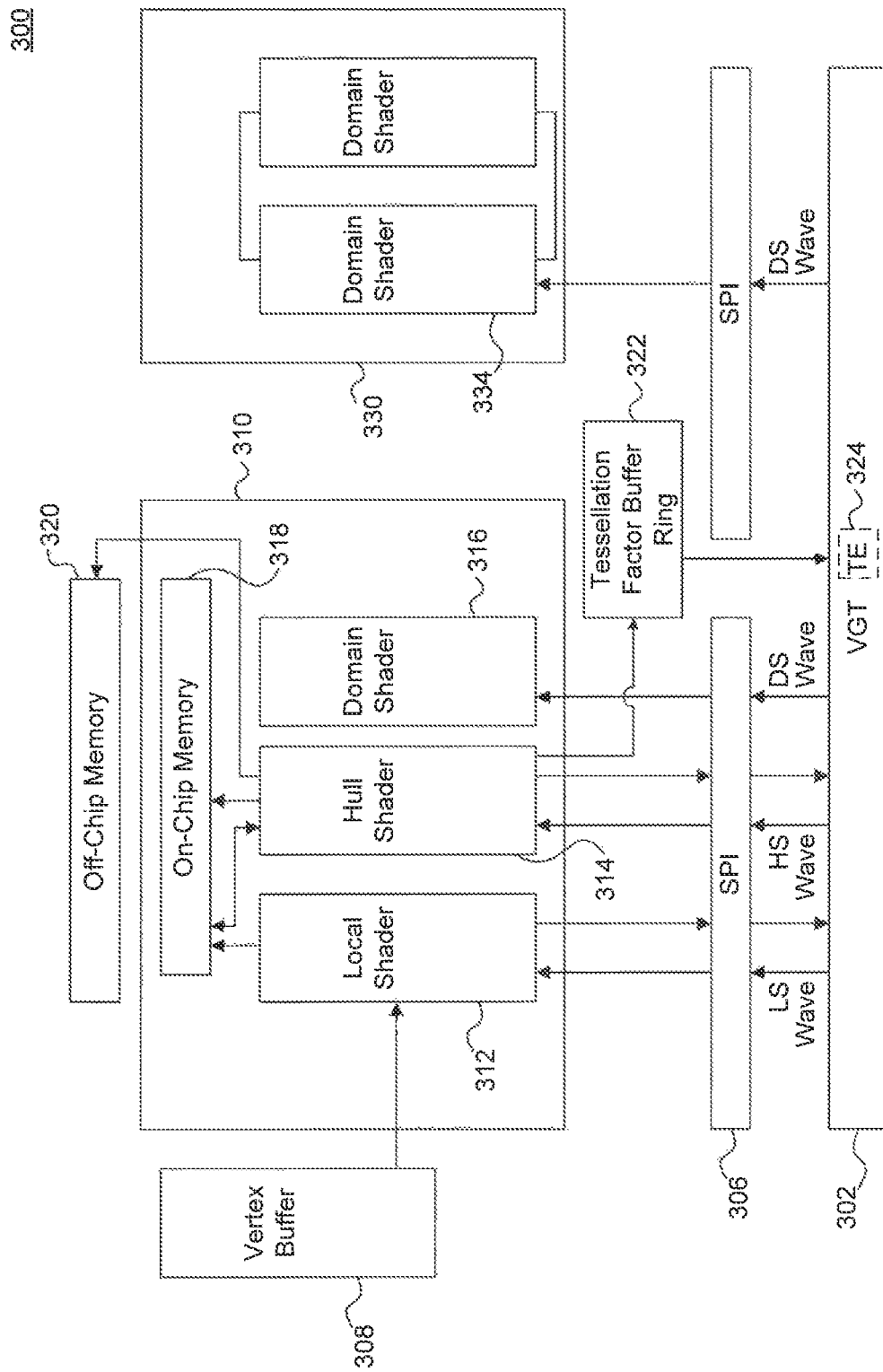
FIG. 3 illustrates an exemplary block diagram of an APD using a Dx11 pipeline, according to an embodiment.

FIG. 3 is a block diagram illustration of an APD 300, according to an embodiment of the present invention. APD 300 includes a vertex grouper and tessellator (VGT) 302, a shader processor interpolator (SPI) 306, a local buffer 308, a first compute unit 310. First compute unit 310 includes a local shader (LS) 312, a HS 314, a domain shader 316, and an off-chip memory 318. APD 300 also includes an off-chip memory 320, a tessellation factor ring buffer 322, and a second compute unit 330. The second compute unit 330 includes domain shaders 334.

Off-chip memory typically has a slower access latency time as more time is needed to access memory that is not local to the requesting processor. Such situations can occur when a processor configured on a first die attempts to access memory contained on a second die within an integrated circuit package containing the two dies. Or, the situation can occur when a processor on an integrated circuit attempts to access memory located on a different integrated circuit. Therefore, throughout this application the use of a first memory with a first access latency and a second memory with a second latency can be used in place of on-chip and off-chip memory.

VGT 302 is configured to receive instructions from a driver (not shown). These instructions include data that contain patch vertices, pointers to index buffer addresses, trigger commands and indices. For example, VGT 302 can process patches as control points and generate LS wavefronts. VGT 302 dispatches one LS wavefront at a time to SPI 306.

SPI 306 can be configured to group LS and HS wavefronts into thread groups. By way of example, SPI 306 allocates register and thread space for the LS output data and the HS output data at the same time. In embodiment, LS 312 is a shader program that processes data received from SPI 306. For example, LS 312 can include a vertex shader program that receives LS wavefronts from SPI 306. LS 312 retrieves data stored in the local buffer 308 and uses the retrieved data to process each LS wavefront. As understood by those of skill in the art, processing of wavefronts can include performing data transformations, lighting enhancements, and other suitable image processing techniques. When the processing of each LS wavefront is complete, LS 312 stores LS output data to on-chip memory 318.

LS 312 produces patches that have an array of control points. When LS 312 has completed processing LS wavefronts, a notification is sent to SPI 306. SPI 306 de-allocates registers and notifies VGT 302 that the last LS wavefront has been processed.

VGT 302 sends HS wavefronts to SPI 304 that are grouped into HS thread groups. The HS wavefronts are then dispatched to HS 314. HS 314 executes an HS program and a patch constant function on every HS wavefront.

As described above, HS wavefronts can include a plurality of patches including a plurality of control points. HS 314 executes an HS program on each control point within the plurality of patches to produce HS output data. After each patch is processed, HS 314 calculates tessellation factors related to the HS output data. Tessellation factors can be used by HS 314 to calculate one or more control parameters.

The value of each control parameter can be calculated by determining an average of the tessellation factors, a peak tessellation factor, or any other suitable combination. A person skilled in the art will appreciate that examples using the average of the tessellation factors and the peak tessellation factor are given by way of example and not limitation and that other calculations for may be used to determine the control parameter. In an embodiment, in the exemplary APD 300 of FIG. 3, HS 314 is configured to conditionally write HS output data, that requires a high amount of tessellation, to off-chip memory 320.

In the embodiments, off-chip memory 320 can be a global memory, such as a system memory or a cache. Off-chip memory 320 can also include non-persistent memory such as DRAM. Off-chip memory 320 stores, e.g., processing logic instructions, constant values, and variable values during execution of portions of applications or other processing logic.

In one embodiment, parts of control logic required to perform one or more operations on APD 300 can reside within off-chip memory 320. The term "processing logic" or "logic," as used herein, refers to control flow instructions, instructions for performing computations, and instructions for associated access to resources.

The purpose of HS 314 storing HS output data to off-chip memory 320 is to prevent shader resources of compute unit 310 from becoming a bottleneck. In the illustrious embodiments, HS 314 can dynamically decide whether to store HS output data to on-chip memory 318, or off-chip memory 320, by comparing the controlled parameter to an HS threshold.

On-chip memory 318 can be a local memory, such as a local data storage memory or a cache memory. Additionally, on-chip memory 318 can be persistent or non-persistent, as described above. Persistent memory can include one or more of a hard disk drive, flash memory, and other similar devices.

The HS threshold is used to control the storage of data in on-chip memory 318 and off-chip memory 320. In one embodiment, the HS threshold, which represents the maximum amount of tessellation that can be applied to a patch by a compute unit, can be set by a user or by a driver. For example, if the controlled parameter is less than or equal to the HS threshold, the HS output data is written to the on-chip memory 318 and not to off-chip memory 320.

When the control parameter is higher than the HS threshold, HS 314 stores the HS output data to off-chip memory 320. Alternatively, when the control parameter is higher than the HS threshold, HS 314 can store a portion of the data to on-chip memory 318 and the remaining portion of HS output data can be conditionally stored to off-chip memory 320.

HS 314 also stores tessellation factors to a tessellation factor ring buffer (TFRB) 322. TFRB 322 can be an off-chip memory cache that is globally accessible to other devices in block diagram 300. HS 314 also writes a control word that corresponds to all tessellation factors.

The control word is a bit indicative of whether the HS output data has been stored to on-chip memory 318 or conditionally stored to off-chip memory 320. For example, if HS 314 stores the HS output data to on-chip memory 318, a HS bit will be set to 0 (e.g. dynamic_hs=0). In another example, if HS 314 conditionally stores the HS output data to off-chip memory 320, a HS bit will be set to 1 (e.g. dynamic_hs=1).

Advantageously, the ability to determine whether HS output data is stored to off-chip memory 320 enables VGT 302 to inform SPI 306 to reallocate space in registers and on-chip memory 318 that was previously reserved for HS output data. Reallocating reserved on-chip memory 318 increases the capacity of compute unit 310 because other, less demanding, work can be processed. This process reduces the probability of bottlenecking.

In one embodiment, VGT 302 reads data that is stored on TFRB 322 and sets a control bit in the thread group indicating where the HS output data is stored. For example, VGT 302 can set a control bit that equals 1 in a domain shader (DS) wavefront. When control bits are equal to 1, DS wavefronts will be dispatched to on-chip memory 318 to retrieve HS output data. Conversely, VGT 302 can set a control bit to 0 in a DS wavefront. When control bits are equal to 0, DS wavefronts may be dispatched to off-chip memory 320 to retrieve HS output data.

In another embodiment, a programmable setting is provided as a dynamic mechanism for determining the number of DS wavefronts dispatched to first and second compute units, 310 and 330, respectively. The programmable setting can be a value or an instruction used to dynamically process at least a portion of the HS output on the first compute unit 310, the remaining HS output will be distributed to other compute units in the system, such as the second compute unit 330. The programmable setting can be triggered by a wavefront threshold that corresponds to a set number of DS wavefronts.

For example, DS wavefronts below or equal to the wavefront threshold can be directed to fetch HS output data from on-chip memory 318. In one example, when VGT 302 sets the wavefront threshold (e.g., NUM_DS_WAVES) to greater than 0, then this threshold is used to indicate that DS wavefronts are to fetch the first NUM_DES_WAVES portion of the HS output data from on-chip memory 318. A portion of the DS wavefronts are processed using compute unit 310, which corresponds with HS 314. A remaining portion of DS wavefronts are processed using compute unit 330.

Conversely, DS wave-fronts that are above the wavefront threshold are directed to fetch HS output data from off-chip memory 320. For example, when VGT 302 sets the wavefront threshold (e.g., NUM_DS_WAVES) to 0, then in response thereto, the HS 314 writes the HS output to off-chip memory 320 because no DS wavefront is guaranteed to be dispatched to first compute unit 310. DS wavefronts fetch HS output data from off-chip memory 320. The retrieved HS output data can be processed on compute unit 330 or any other available compute unit.

Tessellation engine (TE) 324 is configured to tessellate patch edges. For example, TE 324 receives work in the form of thread group from VGT 302. The thread group can include HS wavefronts previously processed by HS 314. The thread group can include a defined number of patches, a pointer to a specific location with TFRB 322, or other control data. TE 324 tessellates each patch based on tessellation factors read from TFRB 322. TE 324 outputs post-tessellation data in the form of DS wavefronts. SPI 306 reads DS wavefronts and then dispatches DS wavefronts to an appropriate domain shader based on control data.

SPI 306 dispatches DS wavefronts to either DS 316 or DS 334 by reading control data set by VGT 302. For example, VGT 302 will flag control data in a DS wavefront indicating where HS output data is stored. SPI 306 reads the control data associated with the DS wavefront, and sends DS wavefronts to the corresponding domain shader. For example, the first DS wavefront triggers the setting of a bit indicating the HS output is stored to on-chip memory 318. In response, SPI 306 will dispatch remaining DS wavefronts to DS 316. Subsequently, DS 316 fetches the HS output data stored in on-chip memory 318.

In another embodiment, VGT 302 sets the control data bit, corresponding to a DS wavefront, indicating the HS output data is stored in off-chip memory 320. Correspondingly, SPI 306 will read the control data and dispatch all of the wavefronts to another domain shader 334, within compute unit 330. Domain shader 334 fetches the HS output data stored to off-chip memory 320.

In another embodiment, the control bit set by VGT 302 can indicate the DS wavefront is stored to both on-chip memory 318 and off-chip memory 320. SPI 306 will read the control data associated with the DS wavefront, dispatching one portion of the DS wavefronts to DS 316 and a remaining portion DS 334 within another available compute unit 330.

Figure 4:
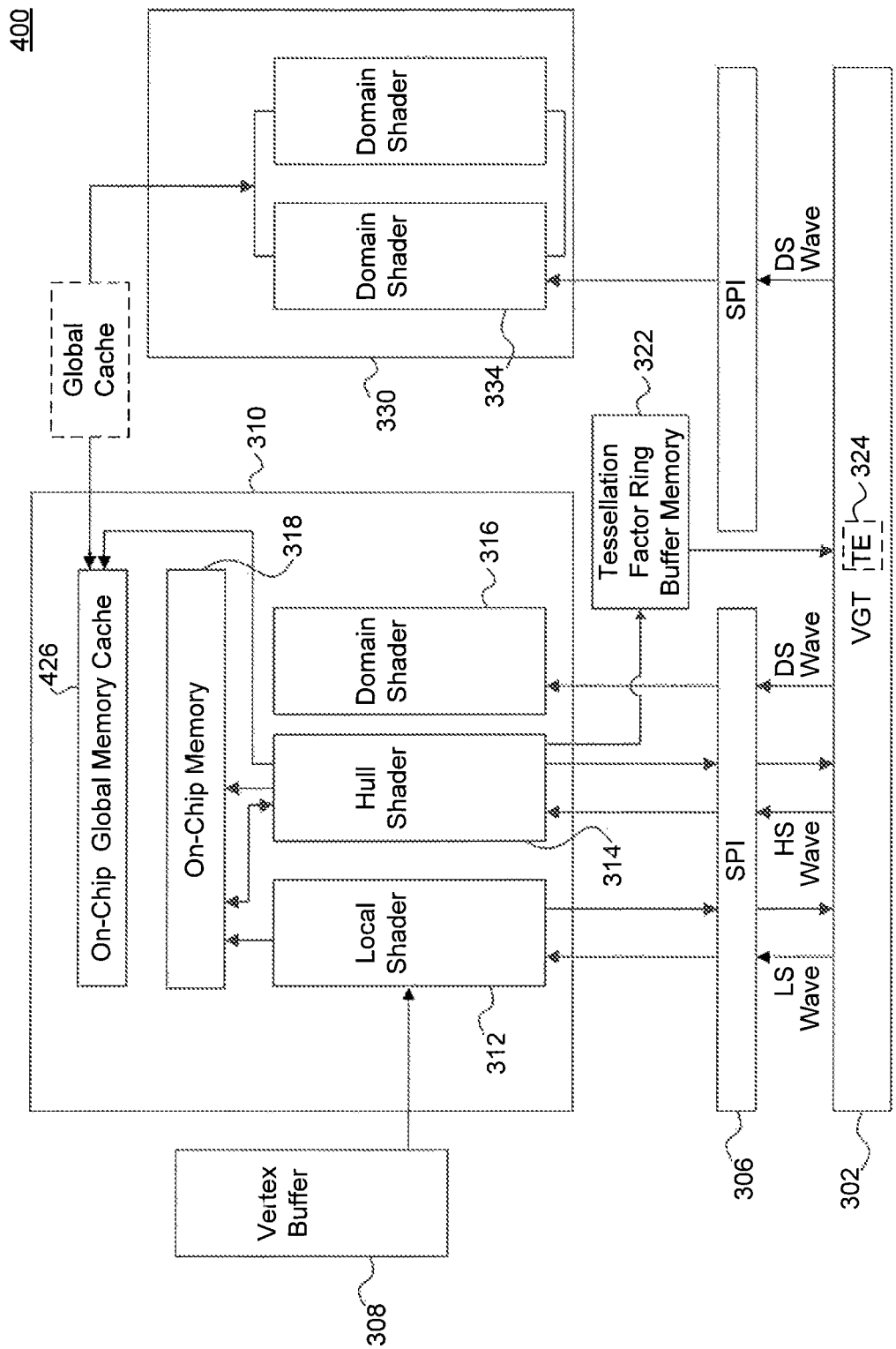
FIG. 4 illustrates an alternative exemplary block diagram of an APD using Dx11 pipeline, according to an embodiment.

FIG. 4 is a block diagram illustration APD 400, according to another embodiment of the present invention. In FIG. 4, APD 400, an on-chip global memory cache 426 is used in place of off-chip memory 320 discussed above. On-chip global memory cache 426 can be a level 2 memory cache that is accessible to all compute units. For example, compute unit 330 can access HS output that is stored on on-chip global cache 426. All other aspects of APD 400 were addressed in the discussions above, and therefore will not be repeated here.

Figure 5:
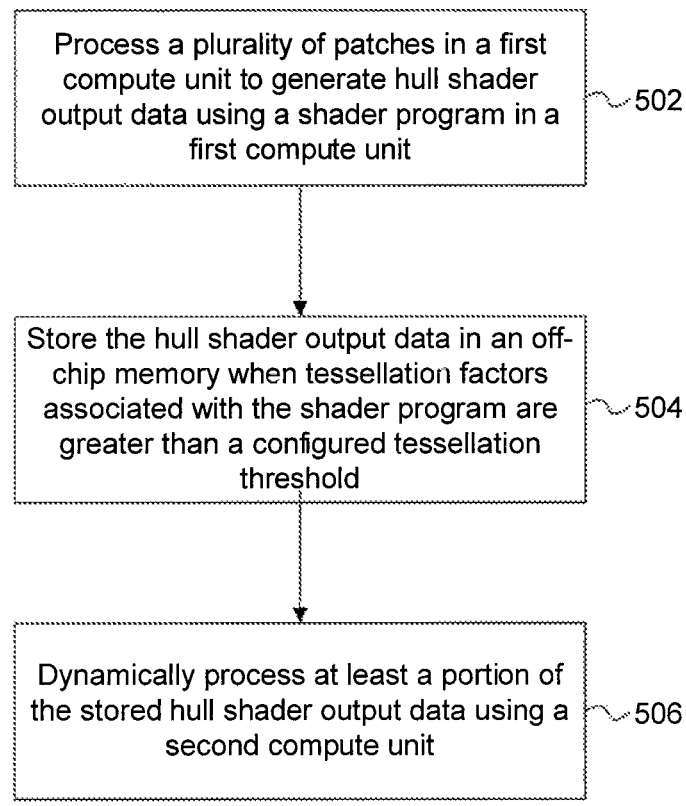
FIG. 5 illustrates a flowchart diagram of a method for distributing tessellation, according to an embodiment.

FIG. 5 is a flowchart of an exemplary method 500 for distributing tessellation within an APD, according to an embodiment.

In operation 502, a compute unit is used to process patches using a shader program. For example, HS wavefronts are processed using HS 314 within compute unit 310. HS wavefronts can include a number of patches generated by VGT 302. HS 314 executes an HS program on every patch in the HS wavefronts to generate HS output data. After each patch is processed, HS 314 calculates the tessellation factors related to HS output data. Initially, HS 314 stores HS output data to on-chip memory 318 when the control parameter, discussed above, is less than or equal to the HS threshold. For example, the control parameter could be an average value of tessellation factors or a peak tessellation factor calculated by HS 314.

In operation 504, HS 314 stores output data to an off-chip memory. For example, when tessellation factors are associated with HS 314 are greater than the HS threshold, the output data is stored to off-chip memory 320. HS 314 also stores tessellation factors and control words to TFRB 322.

In operation 506, a portion of the HS output data is processed on a second compute unit. For example, at least a portion of the HS output data stored to off-chip memory 320 can be dynamically processed using second compute unit 330, or multiple compute units.

In this document, the terms "computer program medium" and "computer-usable medium" are used to generally refer to media such as a removable storage unit or a hard disk drive. Computer program medium and computer-usable medium can also refer to memories, such as system memory and graphics memory which can be memory semiconductors (e.g., DRAMs, etc.). These computer program products are means for providing software to an APD.

The invention is also directed to computer program products comprising software stored on any computer-usable medium. Such software, when executed in one or more data processing devices, causes a data processing device(s) to operate as described herein or, as noted above, allows for the synthesis and/or manufacture of computing devices (e.g., ASICs, or processors) to perform embodiments of the present invention described herein. Embodiments of the invention employ any computer-usable or -readable medium, known now or in the future. Examples of computer-usable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nano-technological storage devices, etc.), and communication mediums (e.g., wired and wireless communications networks, local area networks, wide area networks, intranets, etc.).

It is to be appreciated that the Detailed Description section, and not the Summary and Abstract sections, is intended to be used to interpret the claims. The Summary and Abstract sections may set forth one or more but not all exemplary embodiments of the present invention, as contemplated by the inventor(s), and thus, are not intended to limit the present invention and the appended claims in any way, The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed:

1. A computer-implemented method for distributing tessellations within an accelerated processing device (APD), comprising:
processing, using a hull shader (HS) program, a plurality of patches in a first compute unit;
generating a HS output data from the processed plurality of patches;
calculating tessellation factors related to the HS output data;
storing the HS output data in a first memory having a first access latency when HS tessellation factors of the HS output data exceed a threshold of the HS programs;
storing the HS output data in a second memory having a second access latency when HS tessellation factors are less than or equal to the threshold;
processing at least a portion of the stored output data from the first memory using at least a second compute unit; and
processing at least a portion of the stored output data from the second memory using the first compute unit,
wherein a number of domain shader (DS) wavefronts greater than a wavefront threshold is processed by the at least second unit and a remaining number of DS wavefronts is processed by the first compute unit.

2. The computer-implemented method of claim of claim 1, further comprising:
generating a control parameter based upon tessellation factors; and
comparing the control parameter to the threshold to determine whether to store the HS output data in the first memory or the second memory.

3. The computer-implemented method of claim 2, wherein the control parameter is an average of the tessellation factors.

4. The computer-implemented method of claim 2, wherein the control parameter is a peak tessellation factor; and
wherein the first memory is off-chip memory and the second memory is on-chip memory.

5. The computer-implemented method of claim 1, further comprising:
storing the tessellation factors to a ring buffer memory; and
writing a control word, responsive to each of the tessellation factors, indicative of where the HS output data was stored.

6. The computer-implemented method of claim 1, further comprising:
storing the output data to a global memory cache within the first compute unit, the global memory cache being accessible to the second compute unit.

7. The computer-implemented method of claim 1, wherein the threshold represents a maximum amount of tessellation that can be applied to a patch by the first compute unit.

8. A system for distributing tessellations within an accelerated processing device (APD), comprising:
a first compute unit configured to process a plurality of patches and produce hull shader (HS) output data therefrom and to calculate tessellation factors related to the output data;
a first memory having a first access latency configured to store the HS output data when first compute unit tessellation factors of the HS output data exceed a threshold of a hull shader (HS) program;
a second memory having a second access latency configured to store the HS output data when tessellation factors associated with the HS program are less than or equal to the threshold;
at least a second compute unit configured to process at least a portion of the stored HS output data stored on the first memory; and
the first compute unit configured to process at least a portion of the stored HS output data stored on the second memory,
wherein a number of domain shader (DS) wavefronts greater than a wavefront threshold is processed by the at least second unit and a remaining number of DS wavefronts is processed by the first compute unit.

9. The system of claim 8, wherein the APD is further configured to determine tessellation factors using the shader program.

10. The system of claim 9, wherein the APD is further configured to:
generate a control parameter using the tessellation factors; and compare the control parameter to the threshold.

11. The system of claim 10, wherein the control parameter is an average of the tessellation factors.

12. The system of claim 10, wherein the control parameter is a peak tessellation factor.

13. The system of claim 8, wherein the APD is further configured to:
store the tessellation factors in a ring buffer memory; and
write a control word indicative of where the HS output data was stored.

14. The system of claim 8, wherein the APD is further configured to store the HS output data to a global memory cache within the first compute unit, the global memory cache is accessible to the second compute unit.

15. The system of claim 8, wherein the APD is further configured to store the HS output data to a global memory cache within the first compute unit, the global memory cache being accessible to the second compute unit.

16. The system of claim 8, wherein the threshold represents a maximum amount of tessellation that can be applied to a patch by the first compute unit.

17. A non-transitory processor readable storage device having instructions stored thereon that, when executed by a computing device cause the computing device to perform operations that cause an accelerated processing device (APD) to distribute tessellations, the operations comprising:
processing, using a hull shader (HS) program, a plurality of patches in a first compute unit;
generating HS output data from the processed plurality of patches;
calculating tessellation factors related to the HS output data;
storing the HS output data in an off-chip memory having a first access latency when HS tessellation factors of the HS output data are greater than a threshold of the HS program;
reallocating space in an on-chip memory having a second access latency for storing the HS output data when the HS tessellation factors are less than or equal to the threshold;
processing at least a portion of the stored HS output data from the off-chip memory using at least a second compute unit; and
processing at least a portion of the stored HS output data from the on-chip using the first compute unit.

* * * * *